United States Patent [19]

Scodino

[11] 4,265,566

[45] May 5, 1981

[54] APPARATUS FOR SUPPORTING PIPES SUSPENDED OVER DEPRESSIONS IN THE SEA BED, INCLUDING THOSE SITUATED AT GREAT DEPTH, AND THE METHOD FOR INSTALLING IT

[75] Inventor: Ambrogio Scodino, San Donato Milanese (Milan), Italy

[73] Assignee: Saipem, S.p.A., Italy

[21] Appl. No.: 18,429

[22] Filed: Mar. 7, 1979

[30] Foreign Application Priority Data

Jul. 28, 1978 [IT]  Italy ................................ 26235 A/78

[51] Int. Cl.³ ........................ E02D 27/46; B63C 11/52
[52] U.S. Cl. ................................... 405/172; 405/158; 405/188; 248/49
[58] Field of Search .................. 405/154–158, 405/166–172; 248/49, 55

[56] References Cited

U.S. PATENT DOCUMENTS

| | | | |
|---|---|---|---|
| 2,675,132 | 4/1954 | Susil ................................. | 248/55 UX |
| 3,568,455 | 3/1971 | McLaughlin et al. ............... | 405/154 |
| 4,017,046 | 4/1977 | Hicks ................................. | 248/55 |
| 4,128,219 | 12/1978 | Kaigler, et al. ..................... | 248/49 X |
| 4,146,345 | 3/1979 | Silvestri ............................ | 405/188 X |

*Primary Examiner*—Dennis L. Taylor
*Attorney, Agent, or Firm*—Morgan, Finnegan, Pine, Foley & Lee

[57] ABSTRACT

This invention relates to an apparatus for supporting pipes suspended over depressions in the sea bed, including those situated at great depth, and to the method for installing it on the sea bed. The apparatus according to the invention consists of a completely recoverable service module and a support mobile which serves to support the pipe and remains fixed on the sea bed, said modules being connected together in such a manner that they can be separated by simple controls from the depot ship. The method according to the invention comprises in turn a number of operating steps, through which the entire apparatus is initially lowered and positioned on the sea bed and the service module is then recovered by the depot ship.

3 Claims, 4 Drawing Figures

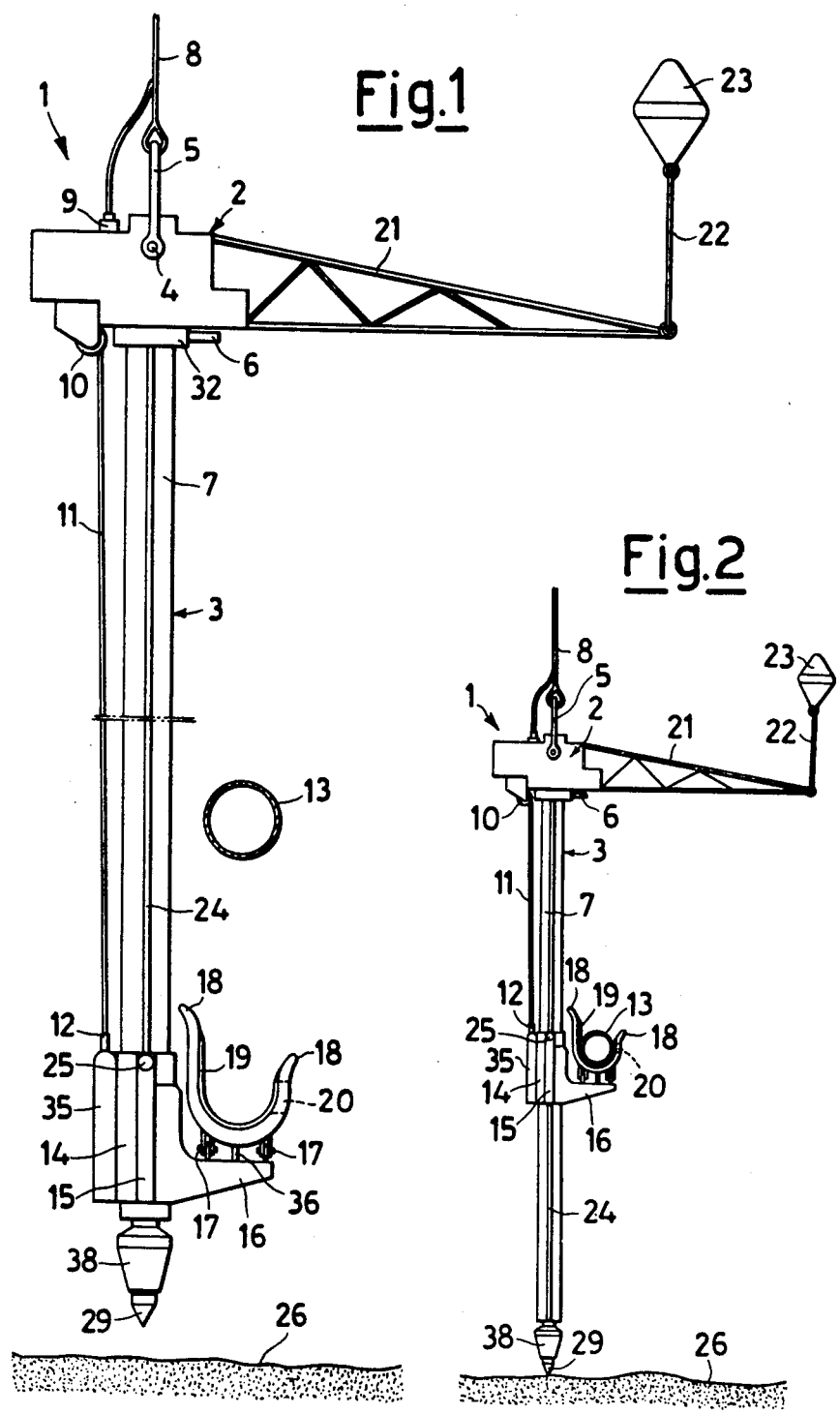

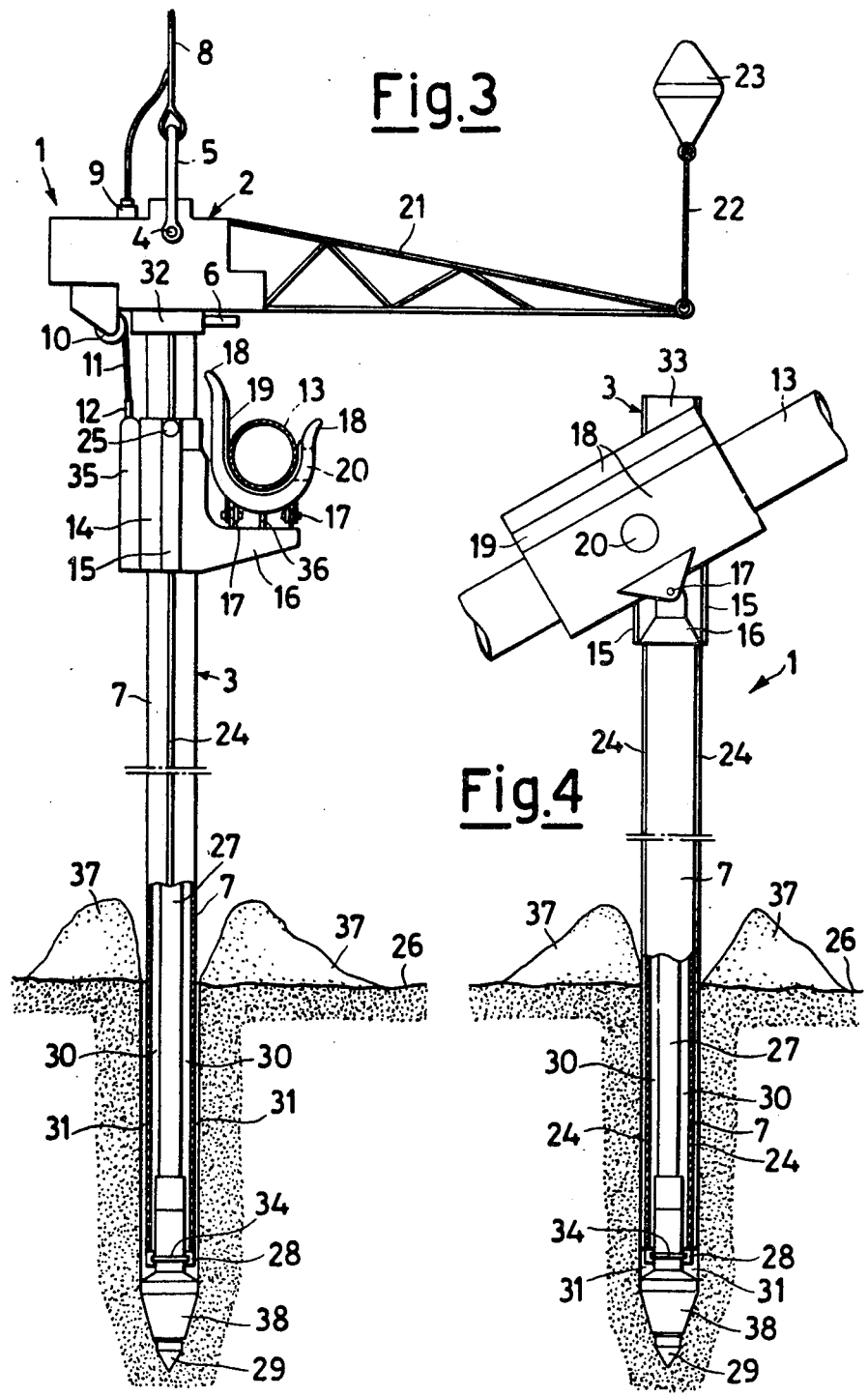

APPARATUS FOR SUPPORTING PIPES SUSPENDED OVER DEPRESSIONS IN THE SEA BED, INCLUDING THOSE SITUATED AT GREAT DEPTH, AND THE METHOD FOR INSTALLING IT

This invention relates to an apparatus for supporting pipes suspended over depressions in the sea bed, including those situated at great depth, and the method for installing it on the sea bed.

When the sea bed is uneven due to rocky crevices, undulations or corrugations, it no longer constitutes the ideal flat base necessary for laying an underwater pipe.

In such a case, it is therefore necessary to install intermediate supports so that the pipe does not remain suspended over the depressions in the sea bed, and so that the allowable bending stress values are not exceeded, as these stresses could cause fracture of the pipe.

The supports used up to the present time are either too bulky and heavy, and therefore their installation requires the use of very costly and complicated means, or are not suitable for firm fixing to the rocky sea bed. In this respect, simply resting the support on the sea bed is not sufficient to stabilize the pipe, which because of sea currents or other reasons is subject to tilting, this being a danger to the proper state of the pipe.

The present invention therefore provides an apparatus for supporting underwater pipes which overcomes the drawbacks of apparatus used up to the present time for this purpose. It is simple, light and economical, and is lowered by a depot ship on to the sea bed to be arranged under the pipe to be supported and rigidly fixed, even to rocky beds, by a simple and economical method which also forms part of the present invention.

Said apparatus consists of a completely recoverable service module and a support module which serves to support the pipe and remains fixed on the sea bed.

The apparatus is characterised by the support module which is constituted by an internally hollow pile of circular cross-section provided on its outside with two diametrically opposing longitudinal toothed guides along which a slide can slide and be fixed in the required position, this slide being provided with a bracket on which is disposed an inclinable seat, the inner surface of which is covered with a layer having a high coefficient of friction, and which serves to receive and lock the pipe to be supported; inside the pile there is disposed a rod, the lower end of which emerges from the pile and is fitted with a cutter having a diameter slightly greater than the outer diameter of the pile; the pile is connected to the service module by a collar disposed in the lower part of the module and provided with a clamp by means of which the pile can be coupled to or uncoupled from said module, whereas the top parts of the rod provided with the cutter is connected by a coupling or a suitable reducer to an electric motor housed in the service module; the slide which is slidable along the pile is connected by a cable to a constant tension winch disposed on the service module.

The service module consists of a casing containing the hydraulic installation, the solenoid valves for operating the various members, and the electric motors, which are supplied with the necessary electricity by a cable connected to the depot ship; it is also provided with means for coupling and uncoupling the support module, a constant tension winch for supporting the slide, means for rotating the rod provided with the cutter, and means for removing the debris produced during drilling, the controls for said means being all housed on the depot ship, which by means of a cable wound about a constant tension winch disposed on the depot ship supports said service module; this latter is also provided with a horizontal arm pointing in the same direction as the slide bracket, and at the end of which there is fixed a cable supported by a float which facilitates the hooking of the module by the articulated arm of the submersible craft which guides the operations of the depot ship from the sea bed.

The constant tension winch disposed on the depot ship supports the service module, which in its turn supports the support module by another constant tension winch. In this manner, the service module and support module are both supported by the winch disposed on the depot ship, and the pressure with which they act on the sea bed for the cutting operation can be adjusted by adjusting the tension in the cable which supports them from the depot ship, whereas the tension in the cable of the winch disposed on the service module which supports the slide with the pipe remains constant and independent of the tension of the winch on the depot ship. In this respect, as the pile sinks, the slide which supports the pipe is raised through a height equivalent to the depth of sinking.

The method for installing on the sea bed the apparatus for supporting pipes suspended over depressions, including those situated at a great depth, consists of lowering the apparatus by means of a support cable operated by the constant tension winch disposed on the depot ship until the cutter point is in proximity to the sea bed, the apparatus being constituted by the service module to which is coupled the support module with the slide positioned at the lower end of the support pile; positioning the apparatus by means of the articulated arm of the submersible craft in such a manner that the horizontal arm of the service module is perpendicular to the pipe to be supported; making the apparatus support pile approach the pipe; raising said slide along the support pile, after the submersible craft has notified the depot ship, by operating the constant tension winch housed in the service module until the pipe to be supported comes initially into contact with the friction material of the inner surface of the support seat, and then becomes clamped and locked to said seat, it then being raised by the amount permitted by the precalculated constant tension in the constant tension winch housed in said support module; lowering the apparatus by operating the constant tension winch fitted on the depot ship until the cutter point touches the sea bed, and simultaneously, as the pile is lowered, raising the slide supporting the pipe by means of the winch disposed on the service module in such a manner as to maintain the precalculated tension constant in the cable supporting said slide; operating the pump to remove the debris and driving the cutter fixed to the lower end of the support module, and which, acted upon only by the weight allowed by the constant tension winch of the depot ship, which also compensates for variations in pressure on the sea bed due to any sudden movement of the depot ship resulting from unfavourable sea conditions, begins to drill the sea bed and continues to do this until the pile has become inserted to the predetermined length, however the cutter must never exceed a lowering in the sea bed such that the arm of the service module is able to touch the pipe, because of which, slightly before this happens and as a result of notification given by the submersible craft, the rotary motion of the cutter is stopped; separating the submersible craft from the arm of the service module; gradually releasing the constant tension of the winch located on board the depot ship such that the apparatus acts with all its weight on the sea bed; uncoupling from the slide the cable of the constant tension winch mounted on the service module after eliminating the constant tension; removing the clamp which fixes the pile to the service module such that the pile together with the cutter rod can be left on the sea bed; and returning the service module to the depot ship such that the service module is thus ready to receive a further pile to be inserted into the sea bed.

The invention is described in greater detail hereinafter with reference to the accompanying drawings, which illustrate one preferred embodiment given by way of non-limiting example only, in that technical or constructional modifications can be made thereto without leaving the scope of the present invention.

In said drawings: p FIG. 1 is a side view of the apparatus suspended from the constant tension winch of the depot ship, and constituted by the service module and support module connected together, and with the cutter point of the support pile in proximity to the sea bed, before arranging the pipe on the slide.

FIG. 2 shows the same apparatus as FIG. 1, but with the cutter point resting on the sea bed and the pipe already arranged on the slide, which is subjected to the constant tension of the winch disposed on the service module.

The upper part of FIG. 3 represents a side view and the lower part a sectional view of the apparatus according to the present invention after the cutter has drilled into the sea bed and the bracket of the slide supporting the pipe has nearly reached the lower edge of the arm of the service module.

The upper part of FIG. 4 represents a front view and the lower part a sectional view of the support module when fixed into the sea bed and supporting a strongly inclined pipe, after the service module has been recovered on board the depot ship.

In the four figures, like parts are indicated by the same numbers.

The apparatus 1 according to the present invention is composed of the service module 2 and support module 3 for supporting the pipe 13, which can be very inclined on the sea bed 26.

The service module 2 is coupled at its top by the pivots 4 and ring 5 to the special support cable 8, which also serves for transmitting both the electricity and the signals for controlling from the depot ship the solenoid valves of the electro-hydraulic installation, which is disposed on the service module and support module and which is not shown. A cable for this transmission branches from said cable 8, and is connected to said support module 3 by way of the socket 9. Said support module houses the constant tension winch 10 which, by means of the special pulling and electrical transmission cable 11 is connected to the vertically sliding slide 14 by means of the coupling system 12 which is operated by the hydraulic accumulators disposed in the compartment 35. In addition, a lead-in collar 32 is disposed in the bottom of said service module, and is provided with a clamp 6 for fixing the pile 7 to said service module 2, in the bore 33 shown in FIG. 4, said clamp 6 being operated by a hydraulic cylinder disposed in the service module and not shown.

Said slide 14 is internally hollow, and embraces said pile 7, which is provided with two lateral toothed guides 24 along which the slide can slide vertically, by way of the two seats 15 with which it is provided laterally, when it is pulled by said cable 11. Said slide is completed by the compartment 35 containing the hydraulic system, not shown, for operating the mechanism 20 for locking the pipe 13 to the seat of the support 18 which, by means of the two pivot supports 17, can assume any desired inclination on the bracket 16 projecting from the slide 14, as shown in FIG. 4. Said seat 18 is covered, on that interior portion which comes into contact with said pipe 13, by a layer 19 composed of a material having a high coefficient of friction, which collaborates with said mechanism 20 for locking the pipe on to said support pile 7; on the top portion of the two seats 15, within which the two toothed guides 24, are arranged the two counterweight stops 25, which, entering said toothed guides, prevent the slide 14 from going down along the pile 7. The service module 2 is also provided with an arm 21, which extends in the same direction and sense as the bracket of the slide 14, and of which the free end is provided with the cable 22, which is supported by the float 23 to aid the hooking of said arm 21 by the articulated arm of the submersible craft, not shown.

In addition, as shown in FIG. 3, by means of an annular groove support 28, said pile 7 removably supports the perforated ring 34 fixed to the lower end of the rod 27 of the cutter 38, said rod being connected at its upper end by means of a suitable coupling to the shaft of the electrical or hydraulic motor installed in the service module and not shown, which provides said cutter with the necessary rotary motion for its point 29 to make the bore in the sea bed 26 into which the support pile is inserted.

Said service module 2 also comprises the means, not shown, for removing the debris produced during drilling, and constituted by a pump which feeds wash water downwards under pressure into the interspace 30 between said rod 27 and the inner wall of the pile 7, the wash water passing through the bores in said ring 34 to then rise along the interspace 31 between the outer wall of the pile 7 and the wall of the bore produced, so depositing about the pile 7 the debris 37 resulting from the drilling of the sea, even if this is of rocky type.

What I claim is

1. An apparatus for supporting pipes suspended over depressions in the sea bed, including those situated at great depth, comprising a completely recoverable service module and a support module for supporting the pipe, these modules being connected together in such a manner that they can be separated by simple controls from the depot ship, wherein the support module is constituted by an internally hollow pile of circular cross-section provided on its outside with two diametrically opposing longitudinal toothed guides along which a slide can slide and be fixed in the required position, this slide being provided with a bracket on which is disposed an inclinable seat, covered on its inner surface with a layer having a high coefficient of friction, which serves to receive and lock the pipe to be supported, inside the pipe there being disposed a rod, the lower end of which emerges from the pile and is fitted with a cutter having a diameter slightly greater than the outer diameter of the pile, the pile being connected to the service module by a collar provided with a clamp by means of which the pile can be coupled to or uncoupled from said module, whereas the top end of the rod provided with the cutter is connected by a coupling or a suitable reducer to an electric motor housed in the service module, the slide which is slidable along the pile being connected by a cable to a constant tension winch disposed on said service module.

2. An apparatus as claimed in claim 1, wherein the service module has a casing containing the hydraulic installation, the solenoid valves and the electric motors for operating the various members of the apparatus, the necessary electrical energy being supplied by a cable connected to the depot ship, it being also provided with means for coupling and uncoupling the support module, a constant tension winch for supporting the slide, means for rotating the rod provided with the cutter, and means for removing the debris produced during drilling the sea bed, the controls for said means being all centred on the depot ship, which by means of a cable wound about a constant tension winch supports said service module, this latter being also provided with a horizontal arm pointing in the same direction as the slide bracket, and at the end of which there is fixed a cable supported by a float, said cable facilitating the hooking of the module by the articulated arm of the submersible craft which guides the operations of the depot ship from the sea bed.

3. In a method for installing an apparatus for supporting pipes suspended over depressions in the sea bed, including those situated at great depth, wherein the apparatus is connected to a depot ship by a cable operated by a constant tension winch and the apparatus has a completely recoverable service module and a support module for supporting the pipe, these modules being connected together in such a manner that they can be separated by simple controls from the depot ship, wherein the service module has a horizontal arm, and wherein the support module has an internally hollow pile of circular cross-section provided on its outside with two diametrically opposing longitudinal toothed guides along which a slide can slide and be fixed in the required position, this slide being provided with a bracket on which is disposed an inclinable seat, covered on its inner surface with a layer having a high coefficient of friction, which serves as a seat to receive and lock the pipe to be supported, inside the pile there being disposed a rod, the lower end of which emerges from the pile and fitted with a cutter having a diameter slightly greater than the outer diameter of the pile, the pile being connected to the service module by a collar provided with a clamp by means of which the pile can be coupled to or uncoupled from said module, whereas the top end of the rod provided with the cutter is connected to an electric motor housed in the service module, the slide which is slidable along the pile being connected by a cable to a constant tension winch disposed on said service module, the steps comprising:

lowering the apparatus, with the slide positioned at the lower end of the support pile, by means of the support cable operated by the constant tension winch disposed on the depot ship until the cutter point is in proximity to the sea bed;

positioning the apparatus by means of the articulated arm of a submersible craft in such a manner that the horizontal arm of the service module is perpendicular to the pipe to be supported;

moving the support pile so that it approaches the pipe;

raising the slide along the support pile by operating the constant tension winch disposed on the service module until the pipe comes into contact with the inner surface of the support seat and locking the pipe thereto;

raising the seat until a precalculated constant tension of the winch is reached;

lowering the apparatus by operating the constant tension winch fitted on the depot ship until the cutter point touches the sea bed, and simultaneously, as the pile is lowered, raising the slide supporting the pipe by means of the service module winch in such a manner as to maintain a precalculated tension constant in the cable supporting said slide;

driving the cutter fixed to the lower end of the support module so that it is acted upon only by the weight allowed by the constant tension winch of the depot ship, which also compensates for variations in the sea bed due to any sudden movement of the depot ship and drills the sea bed until the pile has become inserted to a predetermined length;

removing the articulated arm of the submersible craft from the apparatus;

gradually releasing the constant tension of the depot ship winch such that the apparatus acts with all its weight on the sea bed;

uncoupling from the slide the cable of the constant tension winch mounted on the service module after eliminating the constant tension;

removing the clamp which fixes the pile to the service module; and recovering the service module by means of the depot ship winch so that the former is thus ready to receive another support pile to be driven into the sea bed.

* * * * *